(12) United States Patent
Elliott

(10) Patent No.: US 6,401,400 B1
(45) Date of Patent: Jun. 11, 2002

(54) INDUSTRIAL VAULT

(75) Inventor: Thomas P. Elliott, Arlington, TX (US)

(73) Assignee: NewBasis, LLC, Arlington, TX (US)

( * ) Notice: Subject to any disclaimer, the term of this patent is extended or adjusted under 35 U.S.C. 154(b) by 0 days.

(21) Appl. No.: 09/525,800

(22) Filed: Mar. 15, 2000

(51) Int. Cl.⁷ .......................... E02D 29/12; E04C 1/39; H02G 9/10; F16J 15/10
(52) U.S. Cl. ................. 52/20; 52/21; 52/36.5; 52/79.1; 52/79.9; 52/220.8; 52/649.1; 52/649.7; 52/649.8; 52/745.01; 174/37; 285/64
(58) Field of Search ................. 52/20, 21, 36.5, 52/36.6, 576, 577, 220.8, 79.1, 79.7, 79.8, 79.9, 79.11, 79.12, 79.14, 124.1, 124.2, 125.4, 169.6, 745.01, 649.1, 649.7, 649.8; 174/37, 38; 285/64

(56) References Cited

U.S. PATENT DOCUMENTS

| | | | |
|---|---|---|---|
| 622,778 A | * | 4/1899 | Nordyke ................. 174/37 |
| 1,137,069 A | * | 4/1915 | McIntyre ................. 174/37 X |
| 1,350,306 A | * | 8/1920 | Forshee et al. ............. 52/20 |
| 1,684,195 A | * | 9/1928 | Olmsted ................. 52/649.1 |
| 3,263,378 A | * | 8/1966 | Dorris ................. 52/20 |
| 3,438,157 A | * | 4/1969 | La Monica ................. 52/20 |
| 3,543,457 A | * | 12/1970 | Budlong ................. 52/20 X |
| 3,643,909 A | | 2/1972 | Brosseau |
| 3,695,153 A | | 10/1972 | Dorris |
| 3,731,448 A | | 5/1973 | Leo |
| 3,778,941 A | | 12/1973 | Dorris |
| 3,883,109 A | | 5/1975 | Hahne |
| 3,948,473 A | | 4/1976 | Mason |
| 3,982,363 A | | 9/1976 | Dorris |
| 3,999,493 A | | 12/1976 | Gulya |
| 4,007,941 A | | 2/1977 | Stancati |
| 4,019,760 A | | 4/1977 | Streit |
| 4,055,929 A | | 11/1977 | Stancati et al. |
| 4,075,803 A | | 2/1978 | Alesi, Jr. |
| 4,089,502 A | | 5/1978 | Miller |
| 4,224,861 A | | 9/1980 | Sands |
| 4,231,482 A | | 11/1980 | Bogan |
| 4,253,220 A | | 3/1981 | Work |
| 4,288,952 A | | 9/1981 | Work |
| 4,350,461 A | | 9/1982 | Valiga et al. |
| 4,404,786 A | | 9/1983 | Rotundo et al. |
| 4,476,657 A | | 10/1984 | Juba et al. |
| 4,504,428 A | | 3/1985 | Rotundo et al. |
| 4,506,249 A | | 3/1985 | Huber et al. |
| 4,513,205 A | | 4/1985 | Splinter |

(List continued on next page.)

FOREIGN PATENT DOCUMENTS

| | | | | |
|---|---|---|---|---|
| DE | 3423184 | * | 1/1986 | ................. 174/37 |
| FR | 2293528 | * | 7/1976 | ................. 52/21 |

OTHER PUBLICATIONS

"QUIKSET Utility Vaults", received at USPTO Aug. 30, 1962, 20 page brochure with detailed drawings.*

Primary Examiner—Laura A. Callo
(74) Attorney, Agent, or Firm—Vierra Magen Marcus Harmon & DeNiroLLP

(57) ABSTRACT

This invention comprises reinforced industrial vaults with segmented knock-outs having a variety of shapes and orientations. The invention also comprises vaults having cast-in cable racks. The cable racks can be electrically connected to the reinforcing elements during manufacture, providing electrical grounding of electronic equipment placed in the vault. Cable channels can be installed at desired locations by selecting a knock-out, removing the knock-out and installing a terminator plate having cable conduits. Cable conduits can have diaphragms that can be removed to provide additional choices for locating cable channels. Cable channels can be provided in a vault in the field, even if the vault has been already installed.

26 Claims, 13 Drawing Sheets

U.S. PATENT DOCUMENTS

| | | | |
|---|---|---|---|
| 4,522,579 A | 6/1985 | Rotondo et al. | |
| 4,541,209 A | 9/1985 | Hoag | |
| 4,567,697 A | 2/1986 | Hahne | |
| 4,570,976 A | 2/1986 | Othold et al. | |
| 4,619,471 A | 10/1986 | Harbeke | |
| 4,623,170 A | 11/1986 | Cornwall | |
| 4,641,993 A | 2/1987 | Hahne | |
| 4,709,120 A | 11/1987 | Pearson | |
| 4,732,397 A | * 3/1988 | Gavin | 52/21 X |
| 4,772,389 A | 9/1988 | Guibault | |
| 4,865,354 A | 9/1989 | Allen | |
| 4,883,918 A | 11/1989 | Browning | |
| 4,901,498 A | * 2/1990 | Gerwick, Jr. | 52/649.1 |
| 4,925,395 A | 5/1990 | Franks, Jr. | |
| 4,942,702 A | 7/1990 | Lemasson | |
| 4,976,457 A | 12/1990 | Carter | |
| 5,037,239 A | 8/1991 | Olsen et al. | |
| 5,060,986 A | 10/1991 | Carter | |
| 5,078,613 A | 1/1992 | Salmon | |
| 5,094,622 A | 3/1992 | Auclair | |
| 5,111,000 A | 5/1992 | Maraldo | |
| 5,199,817 A | 4/1993 | Wagner et al. | |
| 5,239,441 A | 8/1993 | Fox et al. | |
| 5,258,572 A | * 11/1993 | Ozecki et al. | 52/21 X |
| 5,336,351 A | 8/1994 | Meyers | |
| 5,340,164 A | 8/1994 | Stultz | |
| 5,370,426 A | 12/1994 | Meyers | |
| 5,401,456 A | 3/1995 | Alesi, Jr. et al. | |
| 5,444,957 A | 8/1995 | Roberts | |
| 5,495,695 A | 3/1996 | Elliot, Jr. | |
| 5,605,419 A | 2/1997 | Reinert, Sr. | |
| 5,624,123 A | 4/1997 | Meyers | |
| 5,711,536 A | 1/1998 | Meyers | |
| 5,778,608 A | 7/1998 | Elliot, Jr. | |
| 5,833,207 A | 11/1998 | Hagenhoff et al. | |
| 5,894,105 A | * 4/1999 | Scyocurka | 52/20 X |
| 5,905,184 A | 5/1999 | Carter, Jr. | |
| 5,925,848 A | 7/1999 | Elliot, Jr. | |
| 5,941,535 A | * 8/1999 | Richard | 52/220.8 X |
| 6,003,271 A | 12/1999 | Boyer et al. | |
| 6,006,944 A | 12/1999 | Machledt | |

* cited by examiner

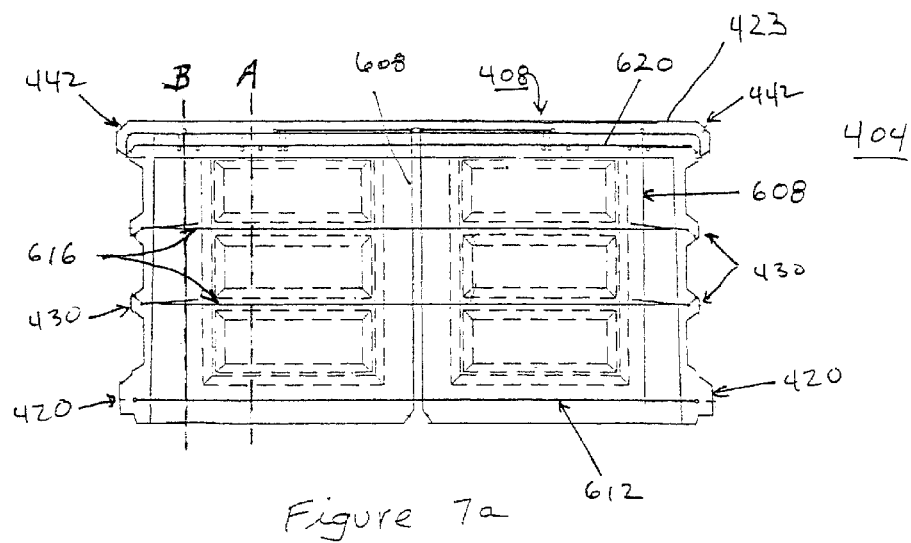
Figure 7a
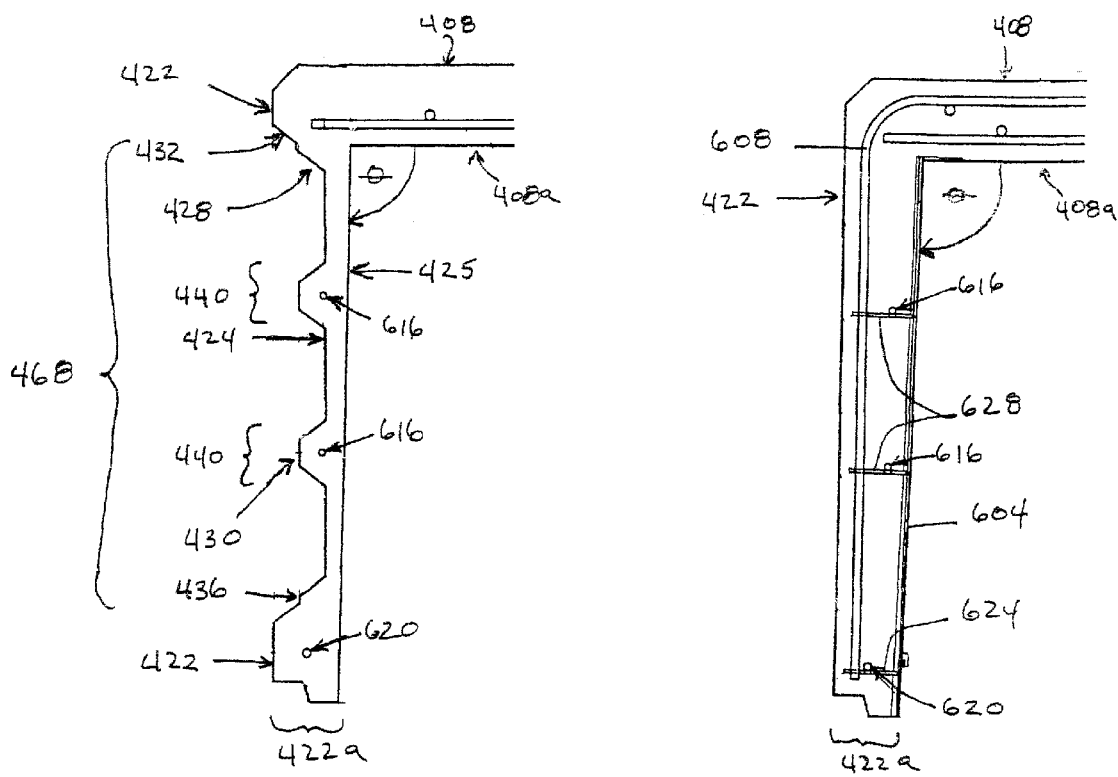
Figure 7b
Figure 7c

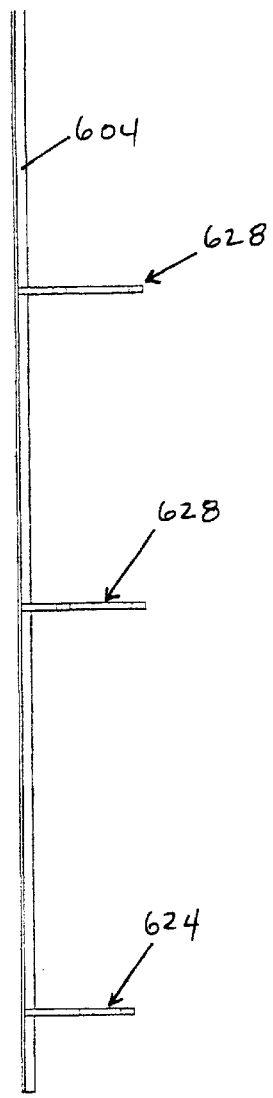
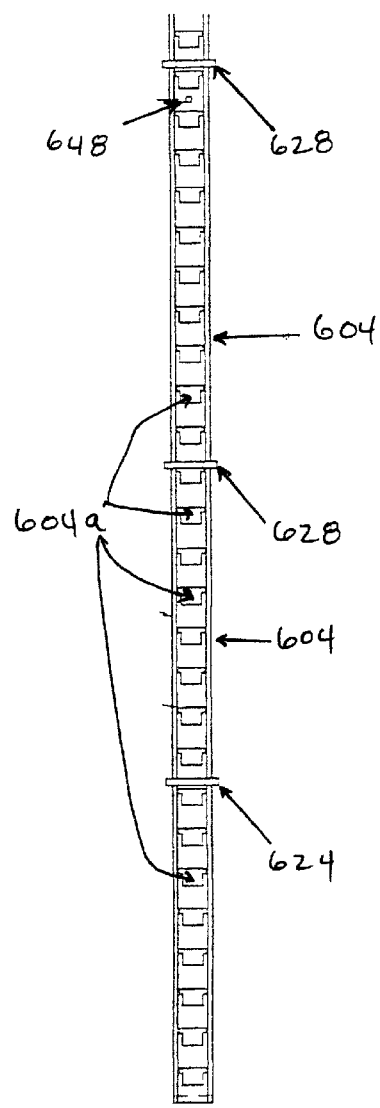
Figure 9a
Figure 9b
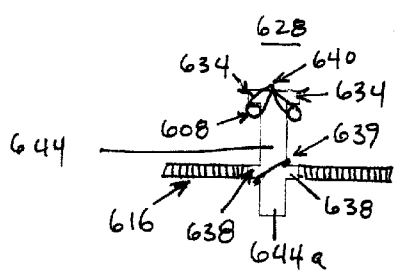
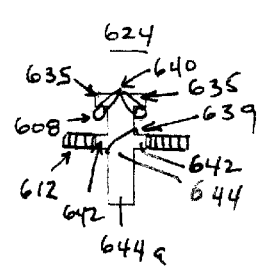
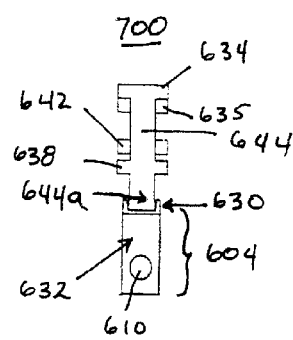
Figure 9c
Figure 9d
Figure 9e

INDUSTRIAL VAULT

BACKGROUND

1. Field of the Invention

This invention relates to industrial vaults.

2. Description of the Related Art

Industrial vaults are widely used as locations for junctions of electrical cables, pipes, and conduits for telephone and electrical power distribution. Typically, vaults are made of concrete and comprise a bottom, sides, and a top. Vaults can include access ports for workers to gain entrance to the vault to install and/or repair the components in the vault. Vaults are cast in forms, or molds, typically made of steel, that define interior and exterior surfaces of the vault. Because vaults are typically placed underground, the walls must have sufficient strength to withstand the vertical and lateral forces exerted by the ground surrounding the vault. The mechanical strength of vaults is increased typically by using reinforcing rods or "rebar" arranged to form a cage. A rebar cage typically includes vertical and horizontal members linked together with wire. A mold surrounds the cage and concrete is poured into the mold, forming a cast vault body, or "core." Other features, including openings and cable rack attachment points are typically made at the time of casting the vault body. After casting, cable racks are conventionally attached to the interior surfaces of vaults at attachment points, termed herein "cable rack inserts." Cable rack inserts are devices that are cast in the vault body and provide a channel for the insertion of a screw used to hold the cable rack in place in the vault. Cable hooks are attached to the cable racks and are points of attachment of cables, junction boxes, "T" junctions, grounding straps, other articles, etc.

Installation of prior art cable racks typically require the casting of a cable rack insert in the body of the vault during its manufacture. Placement of prior art cable rack inserts involves several steps. First, for metal inserts, a worker must enter the form and bolt the cable rack insert into place within the form. Next, the body of the vault, or core is cast. Then, the metal insert must be unbolted from the form, the core is then removed and finally, the cable rack assembly must be bolted into place. In another type of prior art insert, described in U.S. Pat. No. 3,982,363, the cable rack insert is made of plastic and has a weak point, so that after casting of the core the weak point breaks as the core is removed from the mold, leaving the insert in place in the core. This method results in a plastic cable rack insert which is fragile and can be subject to damage or destruction upon bolting the cable rack to the insert. This problem can be especially severe if galvanized bolts are used.

Electrical cables, pipes and conduits typically are inserted into a vault through openings in the side of the vault via terminator plates. Terminator plates and vault openings are typically formed at the time of formation of the vault structure. FIG. 1 depicts a prior art vault as described in U.S. Pat. No. 3,731,448 (incorporated herein fully by reference) having cast-in terminator plates and vault openings. The body of the vault is shown cut-away to reveal the reinforcing bars and duct terminator 19 having holes 33 therethrough. The duct terminator of the prior art vault is positioned within the mold, and is cast into the core. FIG. 2 depicts another example of a prior art terminator plate as described in U.S. Pat. No. 4,075,803 (incorporated herein fully by reference). In this device, the duct terminator is split so that the terminator can be placed around existing cables without requiring the cable connections to be severed. Yet another type of prior art device is depicted in FIG. 3. The device is placed in the form and is cast into the body of the vault. Upon removal of the vault from the form, the device shown in FIG. 3 is a conduit permitting wiring to enter the vault.

In the prior art terminator plates, the the plates and the vault openings are typically located on the basis of either site requirements or specific customer requests. Once manufactured, the configuration of the openings and/or terminator plates is fixed; modifications can be difficult to accomplish without replacing the entire vault. Moreover, neither site-specific nor customer-specific manufacture lend themselves to assembly line production methods. Thus, the cost of the vault is high and the time lapse between customer order and delivery of the finished vault can be undesirably long.

Therefore, prior art vaults can have substantial disadvantages. They are not easily manufactured using assembly line methods, they require more time to manufacture, they expose workers to unnecessary risks, and once made, the configurations are fixed which makes modifications difficult. Moreover, cast-in terminator plates are prone to leak at the concrete-terminator plate boundaries, allowing unwanted substances including water to gain access to the vault. The introduction of such substances increases the likelihood of short circuiting of electrical components, contamination of devices and corrosion of devices within the vault.

SUMMARY OF THE INVENTION

The present invention, roughly described, provides for a vault having thin-walled knock-outs formed at desired locations in the walls of the vault. In some embodiments of this invention, thin-walled knock-outs are placed in arrays on different surfaces of the vault, including the sides, ends and the top, forming "segmented knockouts." The knock-outs can have reinforced "ribs" between knock-outs and can have surfaces that are adapted to receive terminator plates of varying dimensions and configurations. The ribs can be thinner than the major structural portions of the vaults, thereby conserving materials and decreasing the weight of the vault.

The reinforcing members of thin ribs can advantageously be placed in a plane offset from the plane of rebar used to reinforce the major structural portions of the vault, such as exterior corners and sides. Because mechanical strength resisting positive and negative loads is maximized by placing reinforcing members in the middle of a reinforced structure such as a wall, an offset pattern of reinforcing members can provide stronger vaults. In one embodiment, the planes of the major structural members and the thin ribs is different; therefore, the reinforcing members do not meet each other. However, they can be attached to one another using special "rebar support mounting brackets" or "support brackets." Rebar cages are configured using support brackets to permit the joining of rebar members of the segmented knock-outs to the rebar of other structural supporting members, making a monocoque structure, which has greater inherent strength than simple prior art cages.

In one embodiment, vaults have pre-installed cable racks, which can be incorporated into a cage prior to casting the vault. In certain embodiments, the cable racks can be electrically connected to support brackets, which can be electrically connected to the rebar cage. Grounding clamps can be provided on the cable racks so that electrical equipment and connections within the vault can be easily grounded. Thus, there is no requirement for a separate ground strap to protect electrical components.

Vaults can be transported to an installation site and placed at a desired location before locations of access points to the vault are selected. Once sited and placed, access locations to the vault's interior can be selected, knock-outs at those locations can be removed, and terminator plates can be installed. Terminator plates can have an array of separate conduit ports, each port providing a possible point of access to the interior of the vault In alternative embodiments, terminator plates can be pre-installed and subsequently, a desired conduit port in the terminator plate can be selected, an occluding diaphragm can be perforated and a cable channel can be formed. Therefore, the vaults of this invention provide for on-site selection of access points, and can permit multiple modifications of the vault at the site.

In other embodiments of this invention, terminator plates are provided that can be easily installed and can provide tight seals thereby diminishing the contamination of the vault with unwanted materials, including water. In some of these embodiments, the terminator plates comprise two portions. A first portion includes an inside terminator plate that has one or more conduit ports and is placed in an interior surface of the knock-out perforation. A second portion includes an exterior seal plate placed on the exterior surface of the knock-out hole. Segments of the terminator plates can join each other and can be bonded with solvent cement or other adhesive known in the art, providing a tight seal between inside and exterior elements. The junctions between terminator plates and a vault surface can be sealed after installation of terminator plates by injecting a sealant between plate elements and the vault material. After sealant injection, a seal between the terminator plate and the vault is formed that is tighter than possible with cast-in terminator plates.

Alternative designs and configurations of terminator plates are contemplated. In certain embodiments, terminator plates can have an array of locations for attachment of conduit ports. If desired, conduit ports can be made with a diaphragm occluding the lumen. Selected conduit ports can have the diaphragms perforated for insertion of conduits and electric cables. In some embodiments of this invention, multiple conduit ports and conduits can be used to create a number of access points to the vault. Conduits can be attached to the conduit ports and sealed in place, thereby forming a continuous, protected path for electrical wires entering and/or leaving the vault. Cables inside a vault can then be attached to cable racks via cable hooks, and connections, junctions boxes, and other electrical devices can be installed.

The configuration of the vault can be adapted for individualized uses. When it is desirable to provide openings on the top of a vault, vault tops can be provided having both personnel access ports and panels of segmented knockouts.

In other embodiments, it can be desirable to provide a "U"-shaped vault having a flat top. Such embodiments can be connected end-to-end, thereby providing a channel or "trench" of any desired length. Such long vaults can be desirable for electrical power transmission. High-tension electrical cables can be laid within the vault and the vault can be sealed using a flat top. By providing segmented knock-outs and terminator plates of this invention, junctions between the power transmission cable can be provided where desired, thus permitting "T" junctions. Such uses include providing lateral electrical supplies to structures along the power transmission route.

By employing design features of this invention, the thickness of the walls can be minimized, while providing adequate strength of each structural member, thus decreasing material cost and overall weight of the vault. Using the designs of this invention, the total amount of material, such as concrete, can be decreased by approximately twenty five to fifty percent. The designs of vaults of this invention also permit more rapid manufacture, in certain embodiments, decreasing the time required by as much as fifty percent. Moreover, the designs and methods of this invention can provide convenient pre-manufactured vaults made in assembly line processes, and can permit the selection of the locations of terminator plates, conduits, and cables to be made on site. These features and others increase the flexibility of installation of electrical and other components.

BRIEF DESCRIPTION OF THE DRAWINGS

The invention will be described with respect to particular embodiments thereof. Other objects, features, and advantages of the invention will become apparent with reference to the specification and drawings in which:

FIG. 7a depicts a view of an interior of a side of a vault of the present invention, depicting the relationships between vertical and horizontal reinforcing members.

FIG. 7b depicts a cross-sectional view through a side of a vault of the present invention at line A as shown in FIG. 7a, depicting the offset planes of horizontal reinforcing members.

FIG. 7c depicts a cross-sectional view through a side wall of a vault of the present invention at line B as shown in FIG. 7a, depicting the relationships between vertical and horizontal reinforcing members, rebar support mounting brackets, and a cast-in cable rack.

FIG. 9a depicts a side view of a cable rack assembly of the present invention having rebar support brackets.

FIG. 9b depicts a back view of a cable rack assembly of the present invention having rebar support mounting brackets.

FIG. 9c depicts a Type 1 rebar support mounting bracket of the present invention.

FIG. 9d depicts a Type 2 rebar support mounting bracket of the present invention.

FIG. 9e depicts a cable rack in end view, and Type 1 and Type 2 rebar support mounting brackets inserted into a rack channel of a cable rack.

DETAILED DESCRIPTION

I. Vault Construction

The cast vaults of the present invention have design features that can permit flexibility of installation of terminator plates, conduits and cables. Using the designs described in detail below, a manufacturer can decrease the amount of time and materials needed to manufacture the vaults, can provide for installation of terminator plates, conduits and cables in desired locations in the vault, and can provide cast-in cable racks having built-in ground connections. Many of the desirable features derive from the basic design and construction of the vaults, described herein below. Additional features characteristic of the terminator plates and cable racks can be integrated into the vault design.

A. Basic Design

Figure 1:
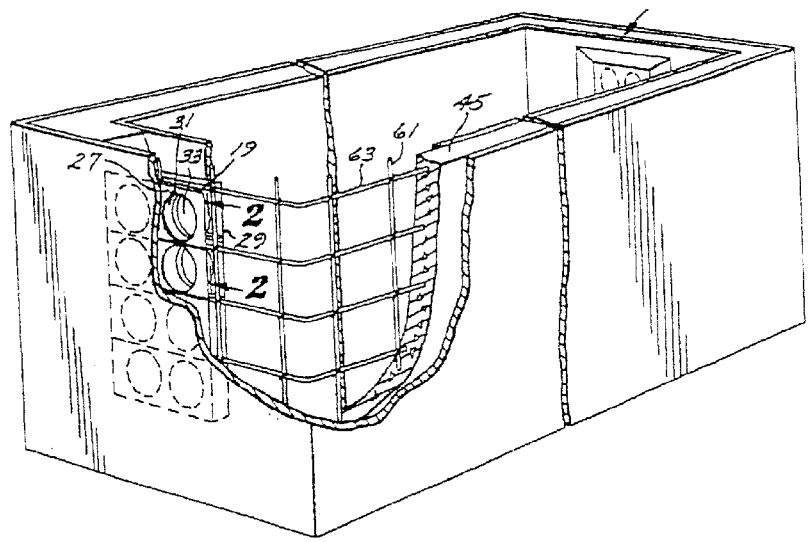
FIG. 1 depicts a prior art vault having cast-in terminator plates.
Figure 2:
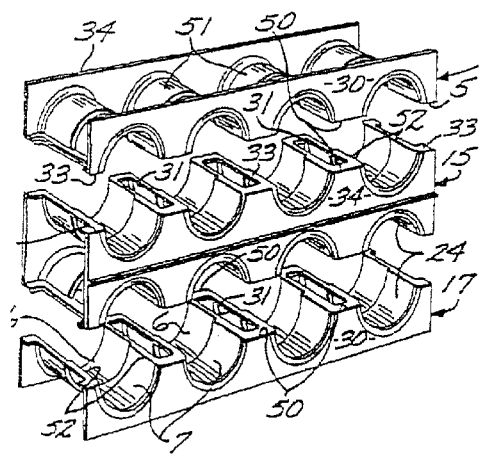
FIG. 2 depicts a prior art terminator plate.
Figure 3:
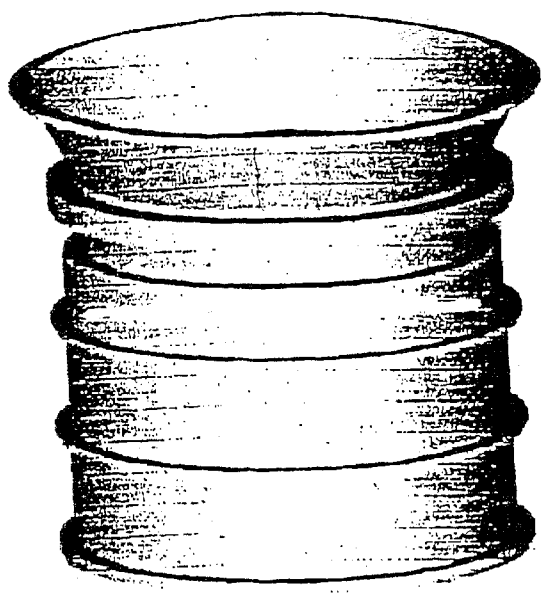
FIG. 3 depicts a prior art terminator plate for cast-in installation.
Figure 4:
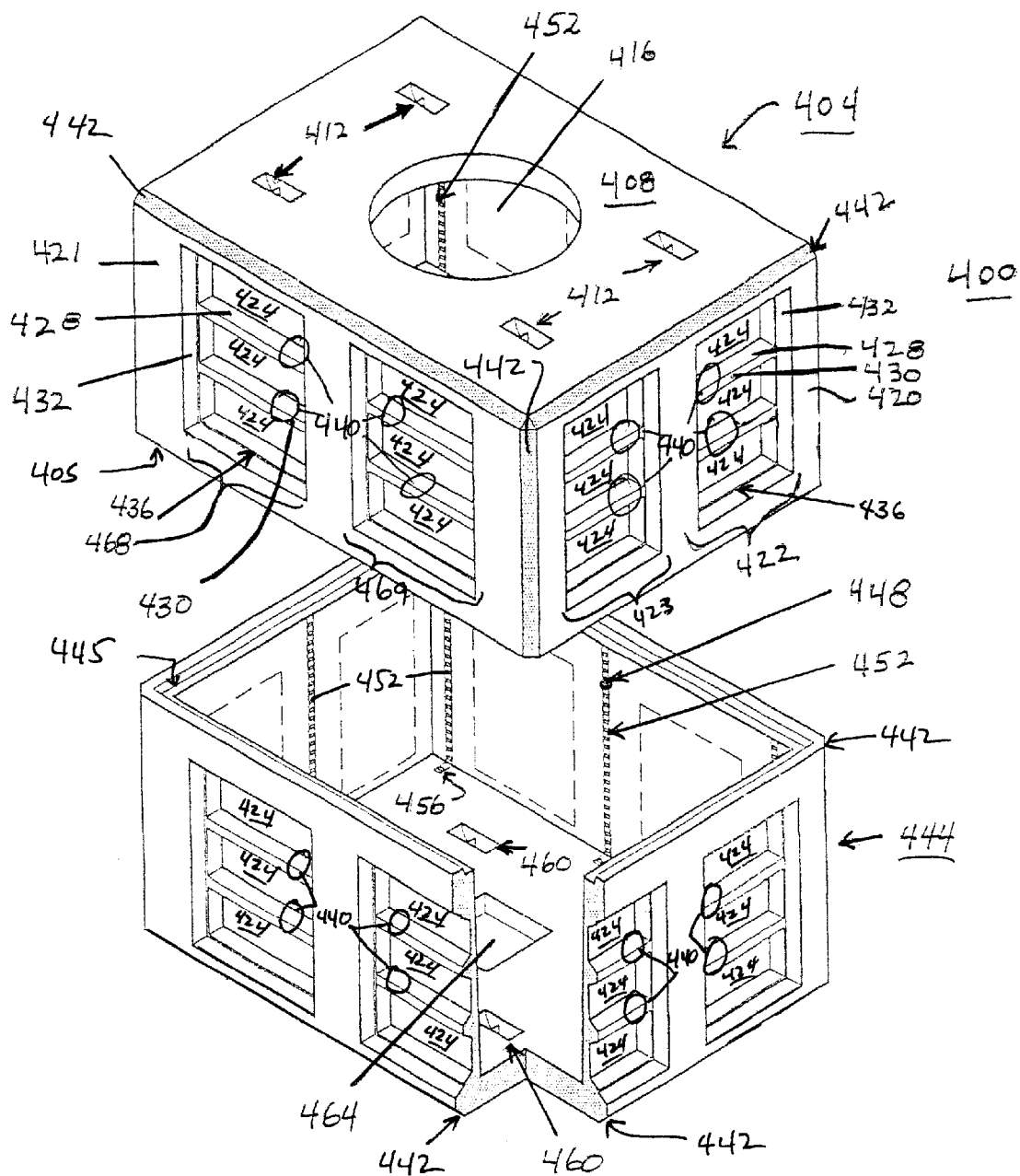
FIG. 4 depicts an isomorphic view of one embodiment of the present invention having segmented knockouts and cast-in cable racks.

FIG. 4 depicts an isomorphic projection of embodiment 400 of this invention having top section 404 and bottom section 444. Top section 404 has a lower edge 405 that is complementary to the top edge of bottom section 444, so that when assembled, the two sections fit together is such a fashion as to minimize the likelihood of the top section falling off of the bottom section. The top section 404 comprises end wall 420, sidewall 421 and top 408. Wall 420 has a set of panels 422 and 423, each panel having three thin-walled, segmented knock-outs 424. Wall 421 has a set of panels 468 and 469, each panel having three thin-walled, segmented knock-outs. Both top section 408 and bottom section 444 have beveled edges 442. Top section 404 and bottom section 444 have pull-in/lifting plates 412 and 460, respectively, to provide points of attachment for hooks used for lifting and positioning the vault sections. The beveled edges 442 also can prevent chipping of corners and thereby can increase the strength of the vault and can decrease the likelihood of cracks forming in the walls.

In certain embodiments, vaults can be manufactured of cast concrete or concrete/polymer having strength sufficient to meet the specific needs of the vault and the siting of the vault. Typically, vaults can be installed such that the top section is below finished grade of up to about 4 feet, and when the water table is assumed to be about one foot below the top of the vault. In certain embodiments, the concrete can have a 28 day compressive strength of about 7000 psi. However, if loading is greater, as encountered with more deeply installed vaults, materials can be selected that have higher compressive strengths.

In certain embodiments of this invention, a portion of a wall farthest from the flat portion (e.g., the top surface 408 of FIG. 4) can be thinner than the portion of the wall nearer the top surface 408. For example, in one series of embodiments of vaults of the present invention, the lower portion of the wall can have a thickness of about 4", whereas the portion of the wall near top 408 can have a thickness of about 5". In these embodiments, the exterior surfaces of opposing walls can be parallel to each other, thus making the interior surfaces of opposing walls non-parallel. In some cases, the shapes of the interior space of a vault section 404 can be a truncated pyramid. This shape can permit easier removal of the core from the form compared to a core having parallel interior surfaces. Top section 404 has personal access port 416 and four galvanized pull-in/lifting plates 412. Bottom section 444 has drainage sump 464 and four galvanized pull-in/lifting plates 460.

B. Segmented and Thin-Walled Knock-Outs

1. Basic Design

In general, a thin-walled knock-out is an area of relatively thin material that can be relatively easily removed to make a hole in the wall of the vault. Referring to FIG. 4, thin-walled knock-outs 424 of this invention can have a thickness of, for example, approximately 0.5 inches, although other thicknesses can be selected. Bordering thin-walled knock-outs 424, reinforced ribs 440 can be present that can have reinforcing members within them to increase mechanical strength. The ribs 440 can be thinner than the major structural portions of the vault, such as the portions of walls near edges. A panel of segmented knock-outs comprises several knock-outs 424 and ribs 440 together. Generally, it can be desirable for the reinforcing members in ribs 440 to be about equidistant from the inner and outer surfaces of the rib.

The placement of several panels of segmented knock-outs in the sidewalls and end walls of top section 404 and/or bottom section 444 of the vaults of this invention provide a large variety of different possible locations for access points into the vault. Therefore, a vault can be pre-manufactured having a number of segmented knockouts, and the locations of the access points need not be selected prior to the installation of the vault at the site.

2. Knock-Outs

The knock-outs of the vaults of this invention can be oriented in any desired direction. FIG. 4 depicts top 404 having horizontally oriented segmented knock-out panels 422, 423, 468, and 469, wherein the knock-outs have a rectangular shape, and are present in arrays of three knock-outs in each panel. Each of panels 422, 423, 468 and 469 comprise ribs 440 having surfaces 428, 430 and 432 on the periphery thereof for placement and sealing of terminator plates. In certain embodiments, surfaces 432 and/or 428 can be beveled, defining an angle relative to the exterior surfaces 420 and 430. Lips 436 can provide a surface continuous with surface 430 of the knock-out ribs. This arrangement of surfaces can permit tight sealing of terminator plates with the wall of the vault and thus can minimize the potential for undesired leaking of materials into the vault. Similar features can be present in bottom section 444.

3. Vault Interior

Bottom portion 444 and top portion 408 have, on their interior surfaces, cable racks 452 that have ground clamps 448 and 456 for electrical grounding of cables and equipment placed in vault 408. Top and bottom portions of the vaults of this invention can also have beveled exterior edges 442, thus permitting easy insertion of lifting devices, such as forks of fork-lifts.

Figure 5:
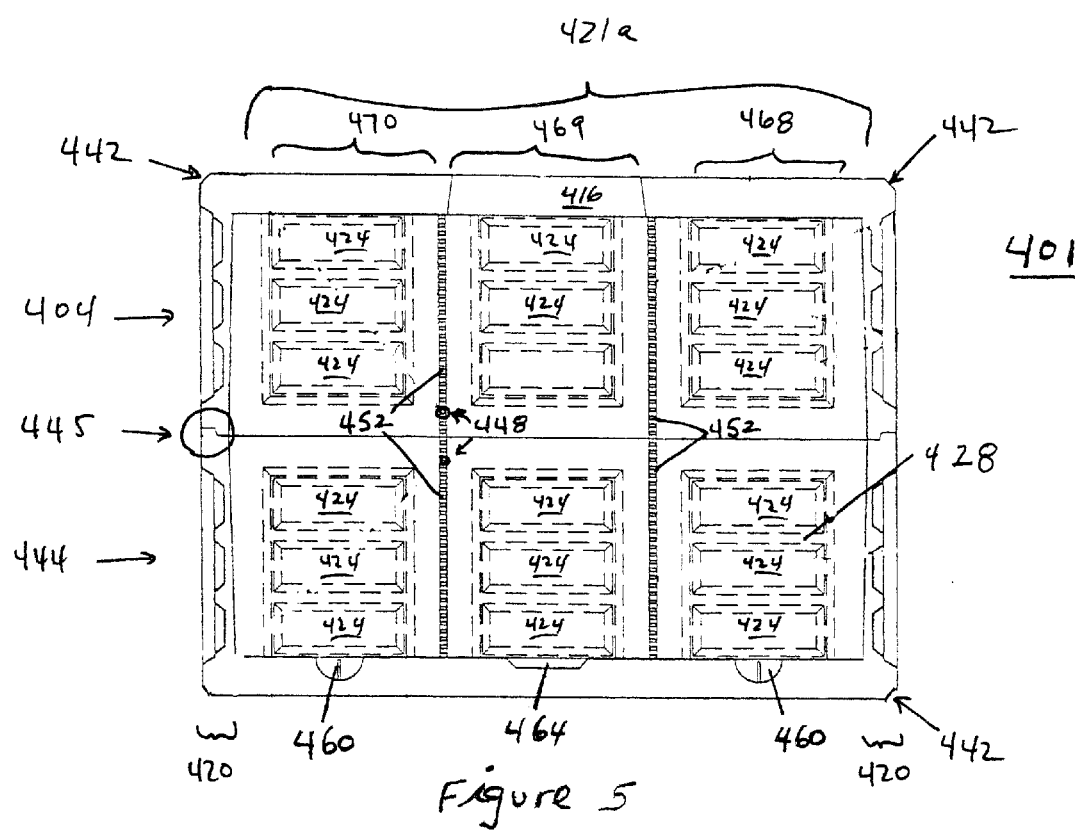
FIG. 5 depicts an interior surface of a vault of the present invention having segmented knock-outs and cast-in cable racks.

FIG. 5 depicts an interior view of a cross-section of vault 401, showing sidewall 421a. Cable racks 452, ground clamps 448, pull-in/lifting plates 460, drainage sump 464, personnel access port 416 and beveled edges 442 are shown. The locations on the exterior surface of panels 468, 469 and 470 of thin-walled knock-outs 424 are shown as dashed lines.

At the right and left hand portions of FIG. 5 are shown the end walls of top section 404 and bottom section 444. The edges of top section 404 and bottom section 444 are shown in an interlocking, complementary pattern 445. Similar configurations on sidewalls can decrease the likelihood of the top section 404 becoming unintentionally disengaged from the bottom section 444.

C. Reinforcing Materials

1. Reinforcing Cage Design

Reinforcing cages of this invention can provide sufficient structural support, even though the thicknesses of the different parts of the vault and orientations of reinforcing members can be different. In one series of embodiments, the major structural components of the vault are thicker than the ribs of the segmented knock-outs. Reinforcing members can provide improved overall strength of a material such as concrete when the reinforcing member is in the middle of the structure. Central placement of reinforcing members can increase mechanical strength in the face of both positive and negative stresses placed on the structure. In certain embodiments of this invention, it can be desirable to place the reinforcing members for the major structural elements and the ribs in different planes, i.e., "offset" reinforcing planes. However, this can lead to difficulties in manufacturing that can be overcome by the use of rebar support mounting brackets described below.

Methods for reinforcing concrete and other materials are known in the art and will not be described herein in detail. However, by way of example only, when reinforcing members are of steel bars, it can be desirable to have reinforcing bars meet ASTM A615 grade 60 standards or ASTM A706 grade 60 standards. Alternatively, equivalent area Fy=80,000 psi ASTM A 185 or A 497 reinforcing cages can be utilized in lieu of grade 60 reinforcing bars. Where rebar or other reinforcing elements make direct contact with each other, the members can be attached together using wires known in the art.

Figure 6:
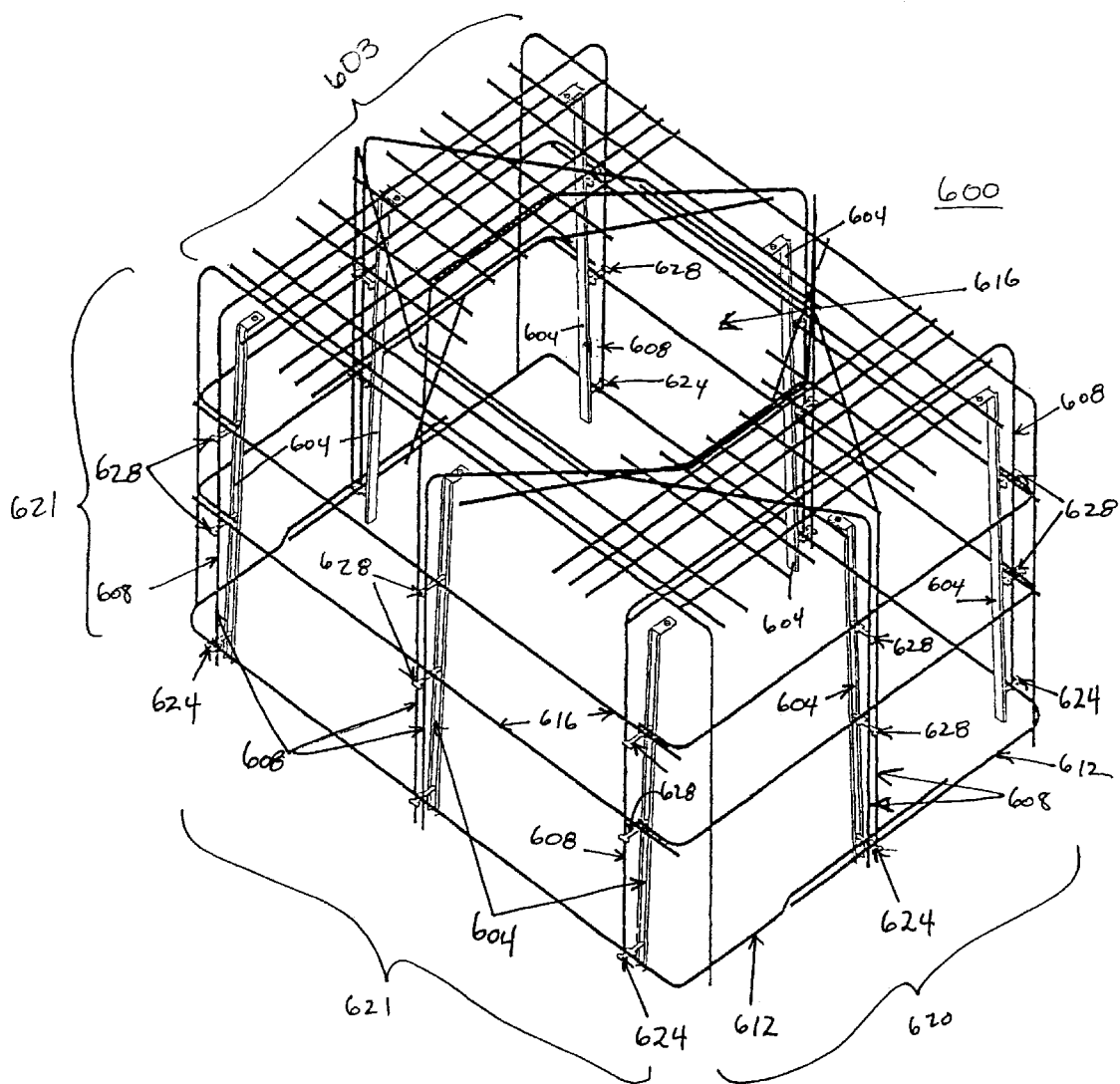
FIG. 6 depicts a reinforcing cage of the present invention, depicting offset planes for reinforcing major structural members and thin ribs, and shows rebar support mounting brackets and cast-in cable racks.

FIG. 6 is a drawing in isomorphic projection depicting one embodiment of a top of a reinforcing cage 600 of the present invention. In general, the reinforcing cage 600 is constructed as a series of overlapping, bent or straight reinforcing members. The cage has top 603, sides 621, and ends 620. Top 603 has an area 616 without reinforcing numbers which is the location of personnel access, port 416 depicted in FIG. 4. Cable racks 604 are aligned vertically, near vertical rebar elements 608. Horizontal rebar elements 612 are depicted near vertical rebar elements 608, and are connected to elements 608 at the bottom of the cage 600 using rebar support mounting brackets 624. Rebar elements 616 are depicted near cable racks 604, and are attached to rebar support mounting brackets 628. Rebar support mounting brackets 628 can be somewhat longer than brackets 624.

In several embodiments of this invention, the sidewalls can be asymmetrical in that the wall thickness can be different at the top and the bottom of the vault section. In FIG. 6, the vertical rebar elements 608 are depicted to be parallel with the exterior of the sidewall 621 of the vault, and cable racks 604 are depicted to be parallel to the interior of the sidewall 621 of the vault. Thus, the interior and exterior walls of the vault are not parallel. As with the embodiment depicted in FIG. 7c below, the sidewall is asymmetrical; the thickness of the sidewall is greater nearer the top portion of the vault as in FIG. 6, or the bottom of the vault as in FIG. 7c. Asymmetrical sidewalls permit easier removal of the vault from the form after casting.

2. Rebar Support Mounting Brackets

In certain embodiments of the present invention comprising reinforcing elements having different central planes, the reinforcing elements may not come into direct contact with one another. Simple attachment of reinforcing elements together by way of wire may not provide the desired structural integrity for the vaults of this invention. Therefore, newly designed rebar support mounting brackets can be used to tie the reinforcing elements together and to provide a site of connection of cast-in cable racks.

FIG. 7a depicts reinforcing elements of a sidewall of a top portion 404 of a vault of this invention. Top surface 408, horizontal rebar elements 612 and 616, and vertical rebar elements 608 are shown. Horizontal rebar element 612 is at the bottom of section 404, and is bent at each end. Thus, a portion of rebar element 612 extends in a plane perpendicular to the plane of FIG. 7a at locations approximately equidistant from the inside and outside surfaces of the end walls 420. Horizontal rebar elements 616 are similarly bent, providing a portion of elements 616 that extend in a plane perpendicular to the plane of FIG. 7a at locations approximately equidistant from the inside and outside surfaces of the ribs 440. Vertical line "A" represents a plane of section depicted in cross-section shown in FIG. 7b, and vertical line "B" represents a plane of section depicted in cross-section shown in FIG. 7c.

FIG. 7b is a cross-section of an inverted portion of top section 404 shown in FIG. 7a along line "A", through a portion of the wall having segmented knock-out 468. The exterior surface 422 of the wall is depicted perpendicular to the surface 423. Horizontal rebar element 620 is depicted about equidistant from exterior surface 422 and interior surface 425. Ribs 440 are depicted as being thinner than the portion of the wall 422a. Horizontal rebar elements 616 are depicted about equidistant from exterior surface 430 of ribs 440 and interior surface 425. Reinforcing elements 616 define a plane that is more toward the interior of the vault relative to the plane defined by rebar elements 620 and 608. The angle θ between the interior surface 425 and the inner surface 408a of top 408 is greater than 90° (e.g. about 93°–95°).

FIG. 7c is a cross-section of an inverted portion of top section 404 shown in FIG. 7a along line "B", an area of the wall not having a segmented knock-out. Vertical rebar element 608 is shown approximately parallel to exterior surface 422. Cable rack 604 is parallel with the interior surface of the wall (not shown), and has an angle θ similar to that of FIG. 7b. Horizontal rebar elements 616 extending from ribs 440 of FIG. 7b are shown near cable rack 604, and are connected to long rebar support mounting bracket 628 and shorter rebar support mounting brackets 624. Horizontal rebar element 620 is shown near vertical rebar element 608. Rebar elements 620 and 608 are each tied to rebar support mounting brackets 624 and element 608 is also attached to rebar support mounting bracket 628.

Rebar support mounting brackets of this invention typically can be made of steel, for example, ASTM A-36 plate having a thickness of ¼". However, other materials and thicknesses can be used to provide structural and electrical continuity of the cage.

II. Cable Racks

The cable racks of this invention can be cast into the wall of a vault during casting. Thus, when the casting is completed, the cable rack is already in place, thereby decreasing the amount of work and time necessary for its installation. The increased efficiency of manufacturing the cable racks of this invention can be due to the design and to the methods of installation.

A. Cable Rack Design

Figure 7D:
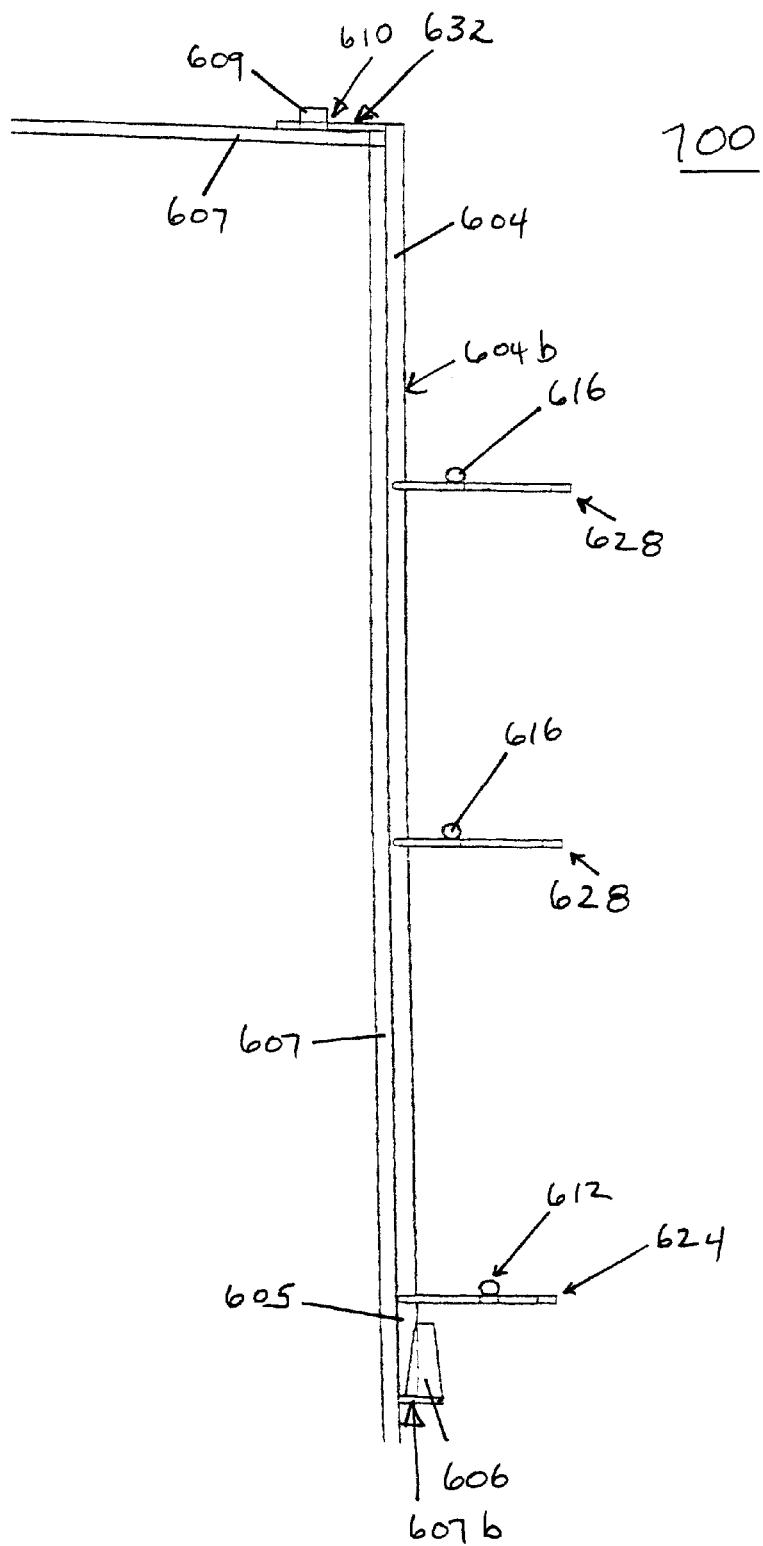
FIG. 7d depicts a cable support rack of the present invention, showing the relationships between the cable support rack, rebar support mounting brackets, and horizontal reinforcing members.

FIG. 7d depicts an example of a cable rack. In certain embodiments, cable rack assembly 700 is pre-manufactured and comprises a cable rack 604, flat bar 632, and rebar support mounting brackets 628 and 624. Cable rack 604 is placed in the form used to cast the vault section. A portion of a form wall 607 is shown, having alignment pin 609 and pyramidal positioning block 606 on base portion 607b. Cable rack 604 is shown positioned against form wall 607 and is held in place at its bottom end by positioning block 606, which engages beveled portion 605 of cable rack 604. At the top end of cable rack 604, a flat bar 632 is attached, having an alignment hole 610 (see FIG. 9e). Alignment pin 609 of form wall 607 is shown engaged with alignment hole 610 of flat bar 632 thereby positioning top of cable rack 604 near form wall 607. Rebar support mounting brackets 628 and 624 are shown attached to cable rack 604. Horizontal rebar elements 616 and 612 are depicted attached to rebar support mounting brackets 628 and 624.

In certain embodiments, cable rack 604 has cable rack hooks (not shown) that engage with cable rack hook "T" holes 604a in cable rack 604 (see FIG. 9b). In those embodiments, it can be desirable to protect the cable rack hook holes from becoming filled with casting material. To decrease the filling of hook holes with casting material, a polymer material can be placed on backside 604b of cable rack 604. With polymer material in place, the casting material, such as concrete or concrete/polymer, does not penetrate the polymer on backside 604b and therefore does not fill hook holes 604a. When the vault section is removed from the casting form, the polymer can be removed by either mechanical means or by the use of a solvent. Once hook holes 604a are cleared, cable hooks can be installed to support cables within the vault.

B. Cable Rack Installation and Rebar Support Mounting Brackets

Figure 8:
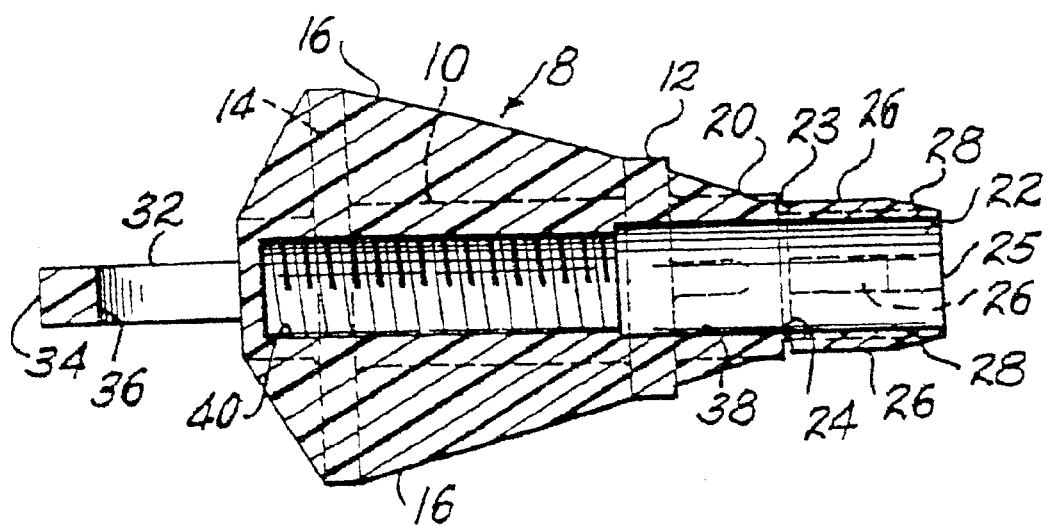
FIG. 8 depicts a prior art cable rack insert.

FIG. 8 depicts a prior art cable rack insert. The insert is made of a plastic material, and is typically bolted in place in the casting form prior to casting the vault. After casting, removal of the vault from the form results in breaking the cable rack insert, leaving a threaded portion remaining in the inside wall of the vault. Cable racks then can be bolted in place on the interior of the vault.

FIGS. 9a–9e depict embodiments of cable racks of the present invention. FIG. 9a is a side view of cable rack 604 having a longitudinal axis and attached rebar support brackets 628 and 624. FIG. 9b depicts cable rack 604 as viewed from the backside, i.e., from within the wall of the vault looking toward the interior of the vault. "T"-shaped cable rack hook holes 604a are shown in cable rack 604. Also shown are rebar support mounting brackets 628 and 624 and ground clamp 648. When installed, the "T"-shaped cable rack hook holes 604a accommodate cable hooks (not shown).

FIG. 9c depicts the relationships between rebar elements 616 and 608, and a Type I rebar support mounting bracket 628. Type I rebar support mounting brackets 628 have a central bar 644, two tabs 634 at one end one on each side of central bar 644, two other tabs 638 near the other end, one on each side of central bar 644, and portion 644a of bar 644 adapted to be engaged with cable rack 604. The distance between tabs 634 and 638 can be greater than the distance between corresponding tabs of bracket 624 (see FIG. 9d). Rebar elements 608 are depicted perpendicular to the plane of FIG. 9c and tabs 634. Wire ties 640 attach rebar elements 608 to tabs 634, providing mechanical and electrical contact between them. If desired, the wire ties 640, rebar elements 608 and bracket 624 can be soldered, brazed, or welded together to provide increased electrical contact and/or mechanical support. Rebar element 616 is shown approximately perpendicular to rebar elements 608 and approximately parallel to the line defined by tabs 638. Wire tie 639 attach rebar element 616 to elements 638 of bracket 628.

FIG. 9d depicts the relationships between rebar support bracket 624 and rebar elements 608 and 612. Bracket 624 is similar in design to bracket 628 except that tabs 635 and 642 can be closer together than the corresponding tabs of bracket 628 (i.e., elements 634 and 638, respectively). Rebar elements 608 are shown perpendicular to the plane of FIG. 9d, and are attached to tabs 635 by wire ties 640. If desired, the wire ties 640, rebar elements 608 and bracket 624 can be soldered, brazed, or welded together to provide increased electrical contact and/or mechanical support. Rebar element 612 is shown parallel to the line defined by tabs 642 and is attached to bracket 624 by wire tie 639. End 644a is adapted to be attached to the "U"-shaped channel 630 of cable rack 604.

FIG. 9e depicts a cable rack assembly 700 in end view, having cable rack 604 with "U"-shaped cable rack channel 630 having ends 644a of rebar support mounting brackets 624 and 628 attached thereto. Tabs 634 and 638 of bracket 628 are shown in the foreground, and tabs 635 and 642 of bracket 624 are shown behind bracket 628. Cable rack 604 comprises flat bar 632 having alignment hole 610 therethrough. When completed, the cable rack assembly 700 can be aligned relative to form wall 607 of FIG. 7d prior to casting the vault.

III Terminator Plates

A. Basic Designs of Terminator Plates

In general, the terminator plates of the present invention comprise an internal element (herein termed an "inside terminator plate") and an exterior element (herein termed a "exterior seal plate"). In certain of these embodiments, the inside terminator plate comprises a conduit port which accepts a conduit from an outside location. An inside terminator plate can be inserted into a knock-out perforation in a vault component and an exterior seal plate can be joined to the inside terminator plate and the junction sealed. When desired, the terminator plates can be sealed to the material forming the vault, thereby providing a tight seal protecting the interior of the vault from contamination by materials leaking into the vault around weak seals. When so joined, the inside and exterior plates can form an open cable channel through the wall of the vault to accommodate cables, conduits or other articles.

B. Configurations of Terminator Plates and Conduit Ports

Figure 10A:
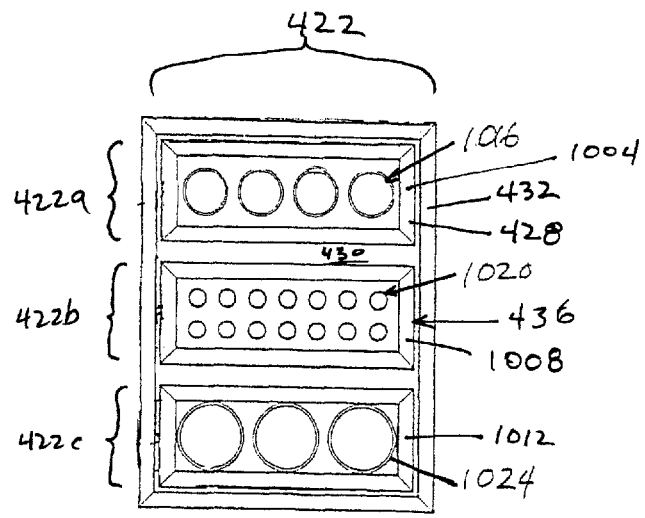
FIG. 10a depicts one array of terminator plates of the present invention having multiple conduit ports.
Figure 10B:
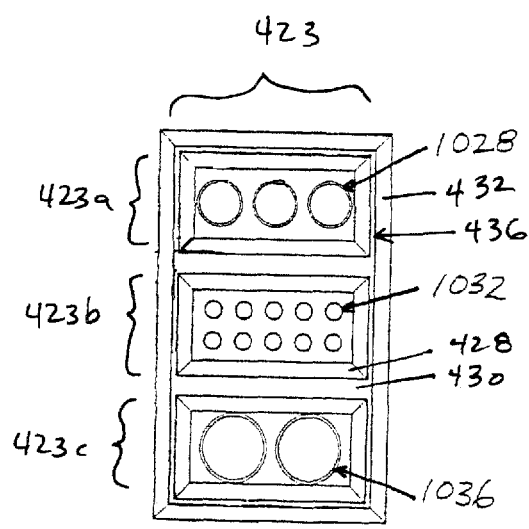
FIG. 10b depicts another array of terminator plates of the present invention having multiple conduit ports.

FIGS. 10a and 10b depict alternative patterns of conduit ports and terminator plates. In FIG. 10a, panel 422 of a vault is shown, having three knock-outs. In the top knock-out 422a of panel 422, a terminator plate 1004 is shown inserted within a beveled portion 428 of a knock-out, as shown in FIG. 4. Exterior surface 432 and lip 436 are depicted. In this embodiment, an array of four conduit ports 1016 are shown.

In another embodiment 1008 (middle knock-out 422b of panel 422), an array of fourteen conduit ports 1020 smaller than conduit ports 1016 are shown. In yet another embodiment (bottom knock-out 422c of panel 422), an array of three conduit ports 1024 are shown.

FIG. 10b depicts another panel (423) of segmented knock-outs having smaller dimension than the panel depicted in FIG. 10a. In the top knock-out 423a, an array of three conduit ports 1028 is shown. In middle knock-out 423b, a panel of ten smaller conduit ports 1032 is shown, and in the bottom knock-out 423c, a panel of two, larger conduit ports 1036 is shown.

It can be readily appreciated that the above configurations are by way of example only. Many other configurations of conduit ports can be provided without departing from this invention. For example, in certain situations it can be desirable to provide circular (or other shaped) terminator plates having arrays of conduit ports arranged in a circular or other pattern.

C. Installation and Sealing Terminator Plates

Figure 11C:
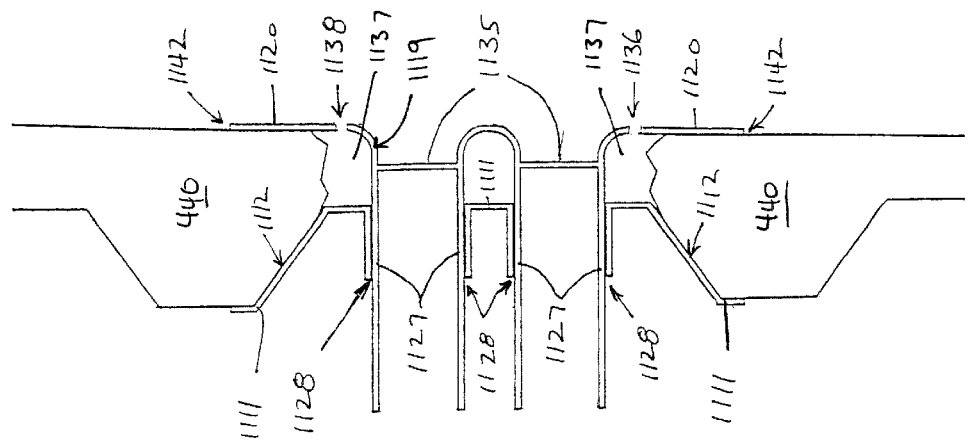
FIG. 11c depicts a cross-sectional view through a terminator plate of the present invention having multiple conduit ports.
Figure 11B:
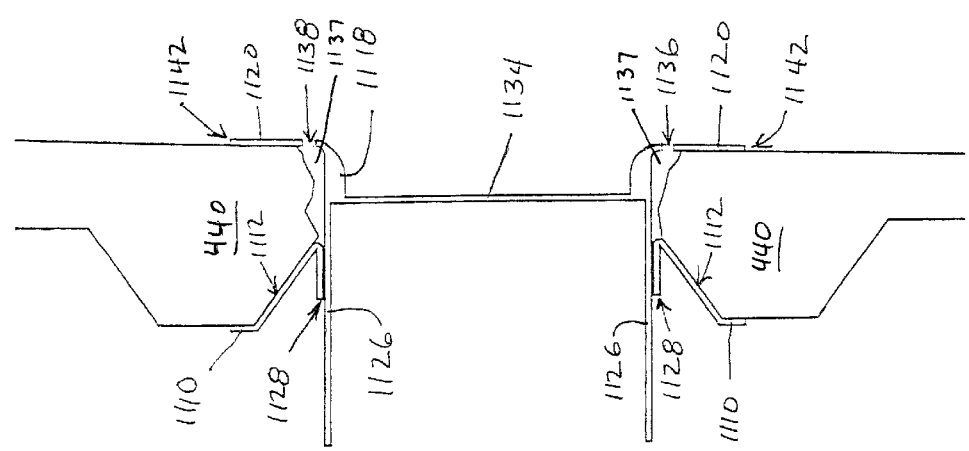
FIG. 11b depicts a cross-sectional view through a terminator plate of the present invention having an alternative configuration.
Figure 11A:
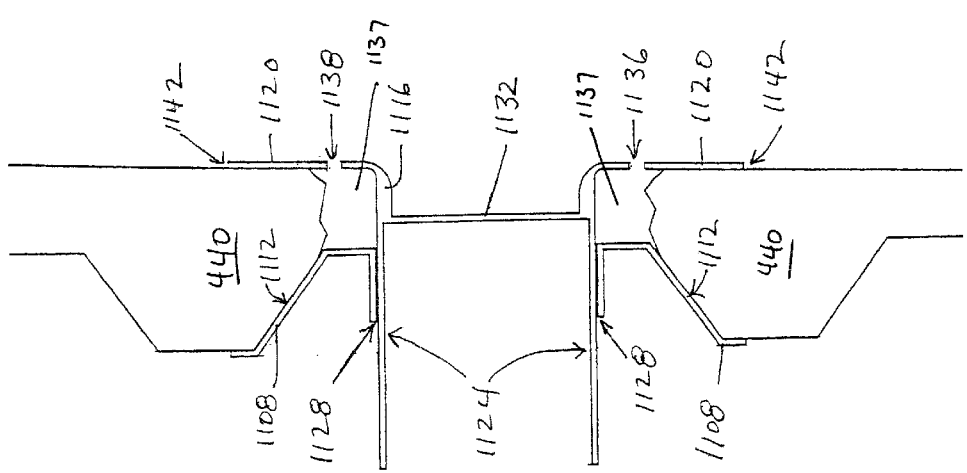
FIG. 11a depicts a cross-sectional view through a terminator plate of the present invention having one configuration.

Details of construction of certain terminator plates of this invention are shown in FIGS. 11a–11c. FIG. 11a depicts one embodiment of a terminator plate of this invention. Rib 440 of a vault is shown, depicting a removed knock-out. Inside terminator plate 1116 is depicted with flange 1120 abutting the interior surface of ribs 440. Conduit port 1124 is depicted extending through the hole in the wall, and is shown having diaphragm 1132 occluding the lumen of conduit port 1124. Exterior seal plate 1108 is shown closely applied to beveled surface of wall 1104. Ribs 440 and exterior seal plate 1108 can be glued together during the insertion of conduit port 1128 and exterior seal plate 1108, or alternatively, can be sealed later (described below). Junction 1128 between conduit port 1124 and exterior seal plate 1108 can be sealed with solvent-based cement, glue, or in embodiments wherein terminator plates are made of polymer, a suitable polymer solvent can be used.

After installing inside terminator plate 1116 and exterior seal plate 1108, a space 1137 can remain, bounded by inside terminator plate 1116, exterior seal plate 1108 and the broken out portion of the vault wall between ribs 440 where the thin-walled knock-out was present. When the knock-out is removed, an irregularly shaped hole with an irregularly shaped wall can be present. In certain embodiments of this invention, this space can be filled with a sealant injected through sealant injection port 1136. Gas and/or excess sealant can escape space 1137 via sealant vent port 1138. In certain of these embodiments, the sealant used, can be sufficiently fluid to penetrate into the junction 1112 between ribs 440 and exterior seal plate 1108, thereby providing a tight seal. When desired, diaphragm 1132 can be perforated, providing a patent cable channel into which cables, conduits, pipes and other items can be placed.

FIG. 11b depicts an alternative embodiment of the present invention. In this embodiment, an inside terminator plate 1118 is provided having a larger conduit port 1126 than the conduit port 1124 shown in FIG. 11a. However the size of the perforated knock-out is shown as similar to that depicted in FIG. 11a. To accommodate the larger conduit port 1126, exterior seal plate 1110 has a larger interior diameter. Otherwise, the installation and relationships between components are similar to those shown in FIG. 11a.

FIG. 11c depicts yet another embodiment of the present invention. In this embodiment, inside terminator plate 1119 has two conduit ports 1127, and two diaphragms 1135.

Exterior seal plate 1111 also is provided, having elements that are complementary to conduit ports 1127. Thus, there is an additional part of exterior seal plate 1111 that is visible in this drawing, between the two conduit ports 1127. In this embodiment, a greater number of conduit ports can be provided for each perforated knock-out. The relationships between the different elements and their installation are similar to those shown in FIGS. 11a and 11b. Because of the greater numbers of conduit ports 1127, if desired, only a few of the diaphragms 1135 can be perforated and others can remain in place, occluding those conduit ports not desired to be opened. If desired, additional diaphragms can be perforated, providing additional channels through the terminator plate.

In certain of the above embodiments, sealant injection can be used to improve the adherence of terminator plates to the vault wall. Improved adherence of terminator plates to the vault wall can provide a tight seal to decrease the unwanted entry of water and other environmental materials from entering the vault. In general, a quick-setting sealant can be desirable, and can include foams, gels, or solutions. It can also be desirable to use a material that is in solution with a volatile solvent. Once injected, the sealant can adhere to the elements and the solvent can evaporate, leaving the seal tight. For uses in which a seal is desired to be water tight, it can be desirable to use an organic solvent/polymer solution. Such solutions include, by way of example only, polyurethane or other organic polymer dissolved in acetone or other ketone, an alcohol, or other suitable organic solvent. Alternatively, it can be desirable to use a silicone-based sealant. However, many other sealants are known in the art and can be used with the present invention.

IV. Alternative Configurations of Vaults

Figure 12:
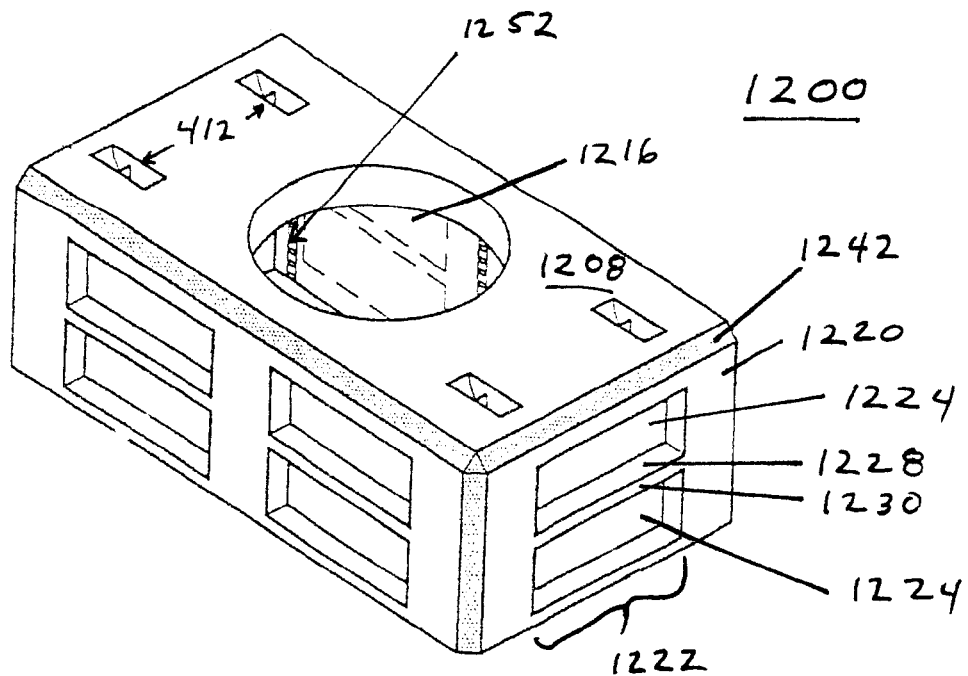
FIG. 12 depicts a top portion of an alternative vault of the present invention.
Figure 13:
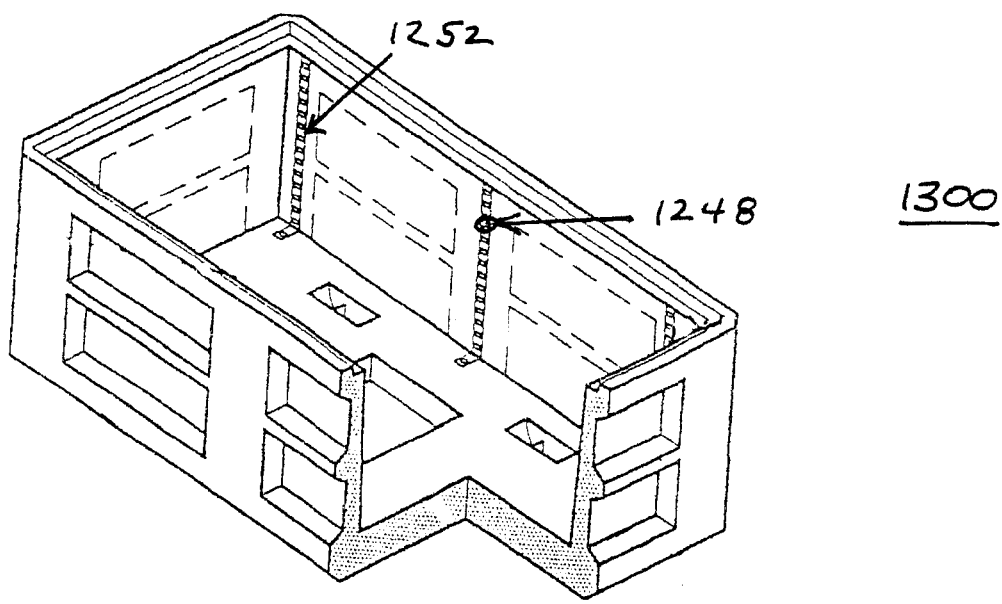
FIG. 13 depicts the interior of a bottom portion of an alternative vault of the present invention.

In yet other embodiments of this invention, alternative designs for vaults and structures are provided. For example, the embodiments described above in FIG. 4 are suitable for relatively large structures, into which a person may gain access. Such structures are suitable for providing large numbers of junctions or large volumes of equipment needed for particular purposes. However, the designs and methods of this invention can also be used for providing structures having smaller dimensions and/or other configurations. For example, FIGS. 12 and 13 are drawings depicting alternative embodiments of this invention. FIG. 12 depicts a top portion 1200 of a vault having smaller segmented knock-outs than shown in FIG. 4. The top 1208 has a personnel access port 1216, pull-in/lifting plates 412, and an end 1220 having a segmented knock-out 1222. Segmented knock-out 1222 comprises thin-wall knock-out portions 1224, and ribs having exterior surface 1230 and beveled surface 1228. Cable rack 1252 is shown visible through personnel access port 1216. Vault 1200 can be used without a corresponding bottom portion; it can be placed on a slab, if desired.

FIG. 13 depicts another embodiment 1300 of this invention, similar to that shown in FIG. 12. In the embodiment of FIG. 13, the vault need not have a corresponding top portion. A slab top can be installed if desired. Cable rack 1252 and ground clamp 1248 are shown and can be similar to corresponding elements of FIG. 4.

Figure 14:
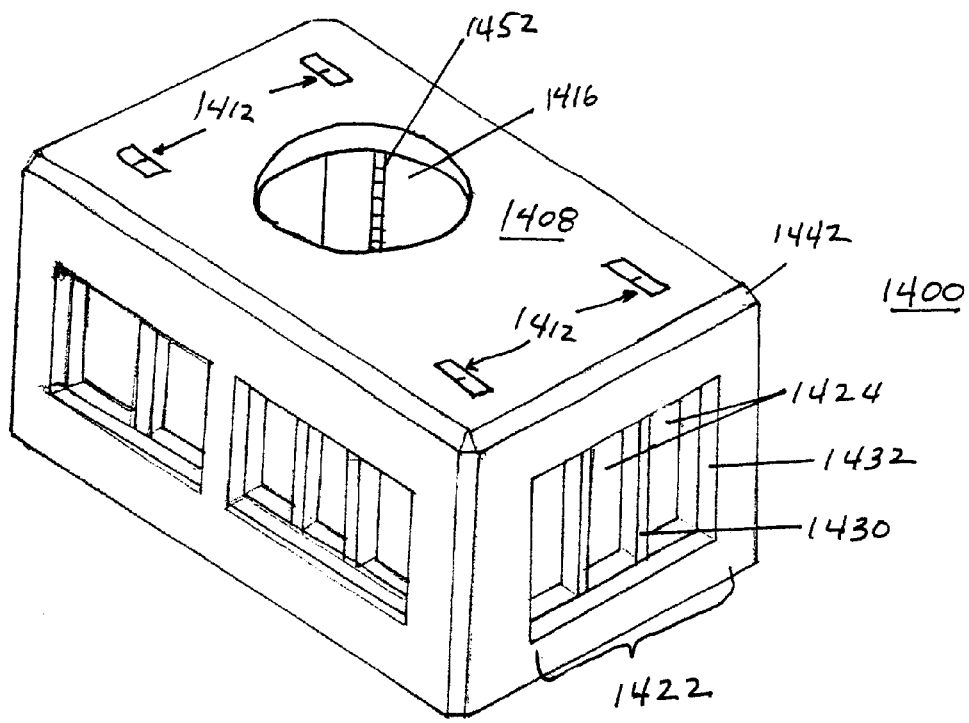
FIG. 14 depicts an alternative embodiment of a vault of the present invention having vertically oriented panels of segmented knock-outs.

FIG. 14 depicts yet another embodiment 1400 of the present invention. In this embodiment, segmented knock-out panel 1422 has knock-outs arranged vertically. This type of orientation can be useful for embodiments in which the vault is exposed to higher downward forces, such as those found when a vault is installed farther underground than about 4 feet below the surface. Top 1408 is shown having a personnel access port 1416 and pull-in/lifting plates 1412. Other features of this embodiment are similar to those depicted above, including cable rack 1452 on the interior surface of the vault wall (seen through personnel access port 1416).

Figure 15:
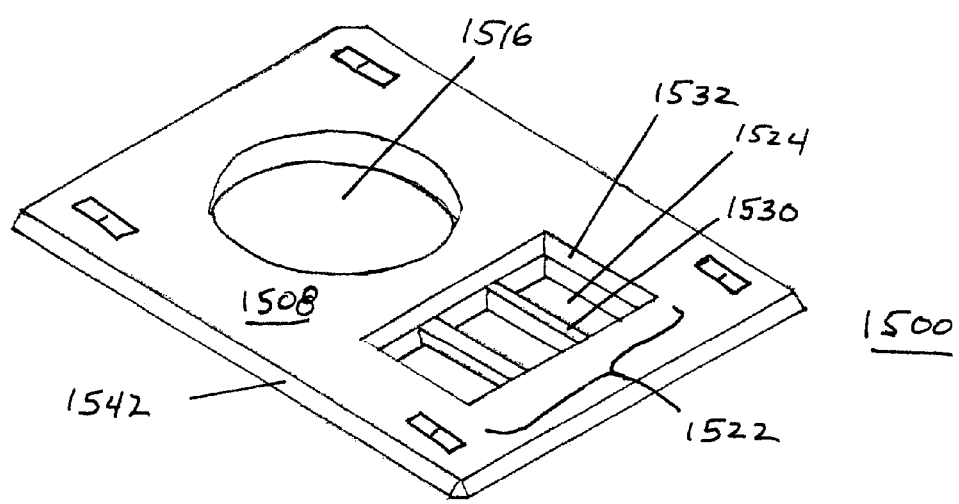
FIG. 15 depicts another alternative embodiment of a vault of the present invention having segmented knock-outs on the top of the vault.

FIG. 15 depicts another embodiment 1500 of the present invention, in which a panel 1522 of segmented knock-outs is provided on the top surface 1508 of the top 1500. It can be desirable to use such an embodiment in situations in which a vertical conduit from the roof is desirable, such as where ventilation of the vault is desired. Other features of this embodiment are similar to those depicted above.

Figure 16:
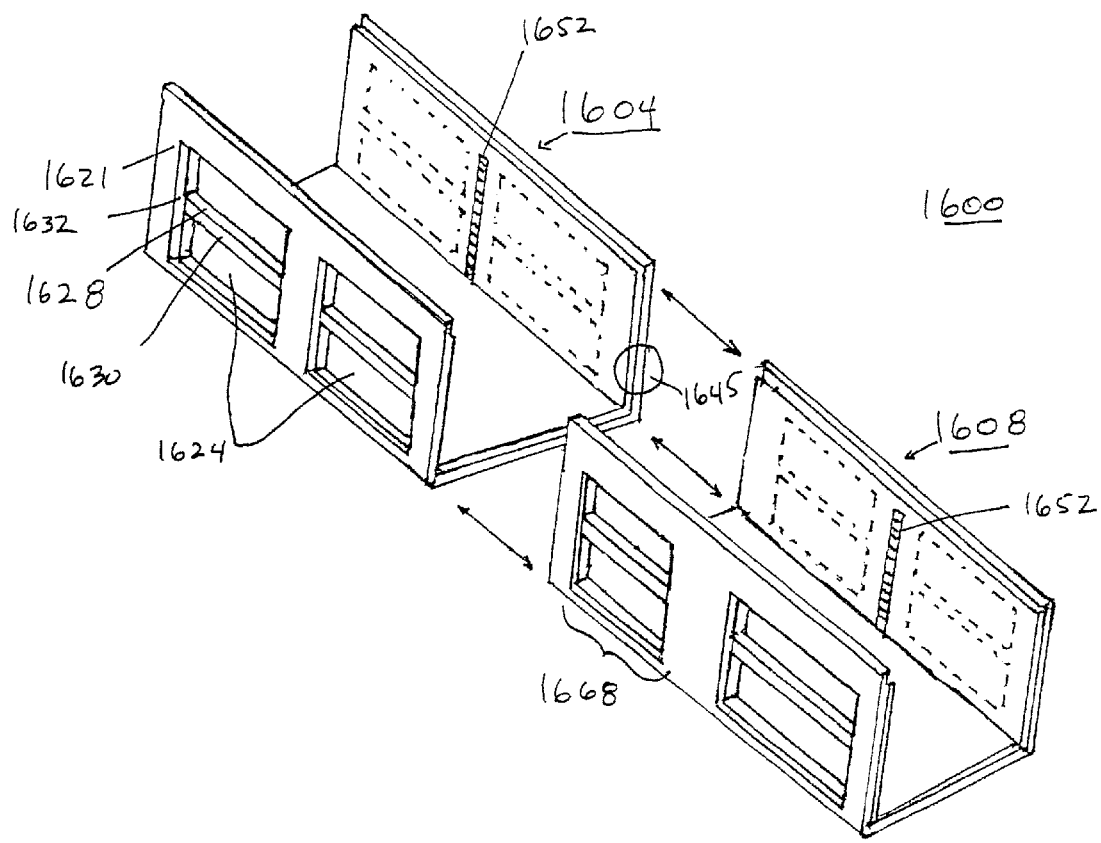
FIG. 16 depicts an alternative embodiment of the present invention having relatively narrow and long vault segments, joined together to form a long channel.

In a yet further embodiment 1600 of this invention, shown in FIG. 16, a long, "U"-shaped channel comprising a desired number of vault modules 1604 and 1608 can be provided for use, for example, in electrical power transmission. A series of vault modules can be provided, having walls 1621 with panels of segmented knock-outs 1668 having ribs 1632 having beveled edges 1628 and flat portions 1630. Modules can be narrower and longer than other embodiments if desired, and can be made without ends, permitting the formation of a long channel comprising a plurality of modules arranged end-to-end. Vault modules can be abutted (as indicated by the arrows), and can have interlocking channels 1645 that can engage with complementary shapes on abutting modules. The junctions between adjacent modules can then be sealed to form a tight channel. Once installed, a top (not shown), similar to the embodiment of a top described above for FIG. 15, can be placed over the channel. Any desired number of modules can be placed end-to-end to form a channel of any desired length. Also, modules can be made having curved portions (not shown), thereby permitting angles to be formed in the power transmission vault. Modules having other shapes can also be used, and can include "T" junctions, "Y" junctions or "hub" junctions, for power distribution to other locations. Advantages of this invention can be readily appreciated in that when and where desired, segmented knockouts 1624 can be removed, and terminator plates installed in the field to provide electrical junctions. Such junctions can be especially useful in the installation of underground electrical, optical, or telephone connections in newly developed areas, such as subdivisions and/or individual structures.

V. Installation of Vaults and Selection of Conduit Locations

One of the advantages of this invention is the flexibility provided in locating the cable channels. In prior art vaults, the location of cable channels typically had to be determined at the manufacturing stage. Thus, the configuration of the vault and its channels was fixed at the time of manufacturing.

By the use of the methods and products of this invention, one can delay the decision about locating conduits until the vault is sited and installed in the field. Thus, to install a vault of the present invention, once a site is determined, an appropriately sized hole can be formed (for underground or partial underground installation) and the vault can be placed therein. Alternatively, if desired, a vault can be placed on a ground-level pad. A location for the terminator plates can be chosen and the appropriate knock-outs can be removed. The vault is then fitted with terminator plates, and conduits are provided. Electrical cables can be installed using the conduits. Subsequently, underground vaults can be backfilled. At some later time, the vault can be exposed, and additional segmented knock-outs can be removed, and additional terminator plates and cable conduits can be placed in the vault walls.

Alternatively, if desired, a vault can be provided with pre-installed terminator plates placed in selected segmented knock-outs. Once the vault has been installed at the site, the locations of conduits can be determined, diaphragms of selected conduit ports can be removed, and cable channels can be formed to accommodate the specific use intended.

Although the above descriptions relate to vaults having electrical uses, the segmented knock-out and terminator plate embodiments can be suitable for a variety of other industrial uses. Those uses include, by way of example only, petrochemical distribution systems, natural or artificial gas pipelines, or any other system for which on-site formation of access points to a vault is desired.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An industrial vault having a cable rack comprising:
    a U-shaped portion affixed to the industrial vault and having a longitudinal axis, a back and two sides, said sides defining a cable rack channel, and
    a first end having a flat bar attached to a portion of said cable rack channel at approximately a right angle relative to said longitudinal axis, said bar having an alignment hole.

2. An industrial vault according to claim 1, further comprising a beveled second end.

3. An industrial vault according to claim 2, further comprising at least one rebar support mounting bracket.

4. An industrial vault according to claim 3, wherein said rebar support mounting bracket is connected to said cable rack and at least one reinforcing member of said industrial vault.

5. An industrial vault according to claim 1, wherein said back has one face within said cable rack channel and another face having a foam backing.

6. An industrial vault including a terminator plate and an opening, said terminator plate comprising:
    an inside terminator plate having a flange sealably abutting an interior surface of a wall of said vault;
    a conduit port adapted to be positioned in the opening; and
    an exterior seal plate sealably abutting a beveled surface of a reinforced rib.

7. An industrial vault according to claim 6, wherein said inside terminator plate further comprises a sealant injection port.

8. An industrial vault according to claim 6, wherein said inside terminator plate further comprises a sealant injection port for injecting a sealant into a space defined between the opening and said terminator plate.

9. An industrial vault according to claim 6, wherein said inside terminator plate further comprises a sealant vent port.

10. An industrial vault including a terminator plate and an opening, said terminator plate comprising:
    an inside terminator plate having a flange sealably abutting an interior surface of a wall of the vault;
    a conduit port adapted to be positioned in the opening; and
    an exterior seal plate sealably abutting beveled surfaces of a plurality of reinforced ribs.

11. A method for forming a cable channel in an installed vault, comprising the steps of:

installing a vault having a plurality of knock-outs;

selecting at least one location for entry of a cable into said vault;

accessing a knock-out at or near said location;

removing said knock-out forming a hole;

inserting an inside terminator plate having at least one conduit port into said hole, thereby creating said cable channel;

engaging the inside terminator plate with an exterior seal plate; and injecting an at least temporarily flowable material into a space defined by said inside terminator plate, said exterior seal plate, and an inner surface of said hole.

12. The method of claim 11, wherein said at least temporarily flowable material comprises a polyurethane foam.

13. A method for manufacturing a cast-in cable rack in a wall of an industrial vault, comprising the steps of:

providing a form for casting a vault, said form having an interior surface and an alignment pin, providing a cable rack having an alignment hole, placing said cable rack along the interior surface of said form, wherein an alignment hole engages said alignment pin; and casting said vault.

14. A method for manufacturing a cast-in cable rack of claim 13, wherein said form comprises a base portion having a positioning block near the interior surface of said form defining a slot between said block and said interior surface; further comprising the step of placing said cable rack along the interior surface of said form, wherein an end of the pin is placed in said slot.

15. The method of claim 13, further comprising the step of applying foam backing between said cable rack and said form.

16. The method of claim 15, wherein said foam comprises polyurethane.

17. A terminator plate assembly for affixing one or more cables in a sealing relation to an opening of an industrial vault, the terminator plate assembly comprising:

an inside terminator plate adapted to sealably abut an interior surface of a wall surrounding the opening;

an exterior seal plate adapted to sealably abut an exterior surface of the wall surrounding the opening, at least one of said inside terminator plate and said exterior seal plate defining a central aperture for receiving the one or more cables, and said inside terminator plate, said exterior seal plate and the opening defining a space surrounding said central aperture; and an at least temporarily flowable material for filling said space.

18. A terminator plate assembly as recited in claim 6, further comprising an injection port formed in said inside terminator plate for allowing entry of said flowable material into said space.

19. A terminator plate assembly as recited in claim 17, further comprising a vent port formed in said inside terminator plate for allowing fluid to exit said space.

20. A terminator plate assembly as recited in claim 17, said flowable material comprising a polymer.

21. A terminator plate assembly as recited in claim 17, said flowable material comprising a polyurethane foam.

22. An industrial vault, comprising:

a knock-out formed by a thin-walled section of the industrial vault; and a terminator plate, including:

an inside terminator plate having a flange sealably abutting an interior surface of a wall of said vault, a conduit port adapted to be positioned in an opening formed by removal of said knock-out, and an exterior seal plate sealably abutting a beveled surface of a reinforced rib.

23. An industrial vault, comprising:

a knock-out formed by a thin-walled section of the industrial vault; and a terminator plate assembly for fitting in an opening formed upon removal of said knock-out, said terminator plate assembly capable of affixing one or more cables in a sealing relation to said opening, the terminator plate assembly comprising:

an inside terminator plate adapted to sealably abut an interior surface of a wall surrounding the opening, an exterior seal plate adapted to sealably abut an exterior surface of the wall surrounding the opening, at least one of said inside terminator plate and said exterior seal plate defining a central aperture for receiving the one or more cables, and said inside terminator plate, said exterior seal plate and the opening defining a space surrounding said central aperture, and an at least temporarily flowable material for filling said space.

24. An industrial vault including a rib having a beveled surface, comprising:

at least one knock-out, a knock-out of said at least one knock-out located adjacent the beveled surface of the rib; and a terminator plate adapted to be positioned in an opening created by removal of said knock-out, said terminator plate including:

an inside terminator plate having a flange sealably abutting an interior surface of a wall of said vault, a conduit port for receiving a conduit, and an exterior seal plate sealably abutting the beveled surface of the rib.

25. An industrial vault as recited in claim 24, said knock-out comprising a thin-walled section of the vault capable of being removed.

26. An industrial vault as recited in claim 25, said at least one knock-out comprising a plurality of knock-outs to provide flexibility in the location of the terminator plate.

* * * * *

UNITED STATES PATENT AND TRADEMARK OFFICE
CERTIFICATE OF CORRECTION

PATENT NO. : 6,401,400 B1
DATED : June 11, 2002
INVENTOR(S) : Elliott

It is certified that error appears in the above-identified patent and that said Letters Patent is hereby corrected as shown below:

Column 15,
Line 53, after "claim", before "further", delete "6," and insert -- 17, --

Signed and Sealed this

Twenty-sixth Day of October, 2004

JON W. DUDAS
*Director of the United States Patent and Trademark Office*